(12) United States Patent
Platt

(10) Patent No.: US 11,176,174 B2
(45) Date of Patent: Nov. 16, 2021

(54) SYSTEMS AND METHODS FOR DATABASE REPLICATION

(71) Applicant: Mastercard International Incorporated, Purchase, NY (US)

(72) Inventor: Gordon Platt, Newmarket (AU)

(73) Assignee: Mastercard International Incorporated, Purchase, NY (US)

(*) Notice: Subject to any disclaimer, the term of this patent is extended or adjusted under 35 U.S.C. 154(b) by 196 days.

(21) Appl. No.: 16/528,021

(22) Filed: Jul. 31, 2019

(65) Prior Publication Data

US 2021/0034643 A1  Feb. 4, 2021

(51) Int. Cl.
*G06F 17/00* (2019.01)
*G06F 16/27* (2019.01)
*G06F 16/28* (2019.01)
*G06F 16/22* (2019.01)

(52) U.S. Cl.
CPC ........ *G06F 16/275* (2019.01); *G06F 16/2282* (2019.01); *G06F 16/284* (2019.01)

(58) Field of Classification Search
CPC ........ G06F 16/13; G06F 16/24; G06F 16/156; G06F 16/178; H04W 56/00; G06N 3/00; G06N 5/00; G05B 13/00
See application file for complete search history.

(56) References Cited

U.S. PATENT DOCUMENTS

| | | | |
|---|---|---|---|
| 6,629,263 B1* | 9/2003 | Sassi | G06F 11/2294 714/15 |
| 9,594,653 B1* | 3/2017 | Misra | G06F 16/2365 |
| 2004/0044763 A1* | 3/2004 | Besson | G06Q 10/10 709/224 |
| 2007/0198524 A1* | 8/2007 | Branda | H04L 67/1002 |
| 2008/0270490 A1* | 10/2008 | Watterott | H04L 67/1095 |
| 2014/0365437 A1* | 12/2014 | Srinivasan | G06F 16/21 707/634 |
| 2016/0057254 A1* | 2/2016 | Arcese | H04L 67/327 709/203 |
| 2017/0032011 A1* | 2/2017 | Song | G06F 16/25 |
| 2019/0332582 A1* | 10/2019 | Kumar | G06F 16/273 |
| 2020/0031639 A1* | 1/2020 | Rauwolf | G05D 1/0297 |
| 2020/0293407 A1* | 9/2020 | Depoutovitch | G06F 11/2094 |
| 2020/0364096 A1* | 11/2020 | White | G06F 9/45558 |
| 2021/0011797 A1* | 1/2021 | Robison | G06F 11/0706 |

* cited by examiner

*Primary Examiner* — Hung D Le
(74) *Attorney, Agent, or Firm* — Hovey Williams LLP

(57) ABSTRACT

Methods and systems for database replication include establishing a plurality of Java database connectivity (JDBC) database connections to a first database. One or more replication operations are received from a second database defining the data changes to be replicated. In addition, one or more replication rules are received defining the replication procedure. Each replication rule specifies an algorithm for determining a discrete database connection for each respective replication operation. The discrete database connection for each respective replication operation is determined by applying the algorithm specified by the one or more replication rules to each respective replication operation. Moreover, each respective replication operation is performed at the first database on the respective determined discrete database connection.

20 Claims, 6 Drawing Sheets

SYSTEMS AND METHODS FOR DATABASE REPLICATION

FIELD OF THE DISCLOSURE

The field of the disclosure relates generally to database replication systems and methods and, more particularly, to systems and methods for improving the performance of database replication by exploiting the multi-processing capabilities of database server to allow for parallel data streams.

BACKGROUND

A known issue with replication software is a requirement that all data table changes (e.g., INSERTS, UPDATES, and DELETES) are applied in the correct order to the replicate database. In the case of at least some known replication software, the SQL statements for processing the changes are generated by decoding a write-ahead log (WAL) stream and are then executed in strictly sequential order. As such, the replication software only uses one database connection for database writes to a replicate database and is therefore unable to write in parallel to exploit the multi-processing capabilities of the database server. The replication software therefore has a limitation that is the maximum rate at which the replication software can parse and execute large batches of changes (e.g., SQL statements) on the single database connection. The single connection limitation imposed by the sequential order requirement limits the efficiency of replication processing by increasing the time necessary to complete database replication. In addition, if database changes are taking place at a rate greater than the maximum rate at which the replication software can parse and execute large batches of changes, the replication operations may fail.

BRIEF DESCRIPTION

This brief description is not intended to identify essential features of the present invention and is not intended to be used to limit the scope of the claims. These and other aspects of the present invention are described below in greater detail.

In one aspect, a method of database replication is provided. The method includes establishing a plurality of database connections to a first database. In addition, the method includes receiving one or more replication operations from a second database. The method further includes receiving one or more replication rules. Each replication rule specifies an algorithm for determining a discrete database connection of the plurality of database connections for each respective replication operation. Moreover, the method includes determining the discrete database connection for each respective replication operation by applying the algorithm specified by the one or more replication rules to each respective replication operation. Additionally, the method includes performing each respective replication operation at the first database on the respective determined discrete database connection.

In another aspect, a system for performing database replication operations in parallel is provided. The system includes a first database having a source table defined therein. The source table includes one or more table records, each table record having an identifier associated therewith. The system also includes a second database for receiving a replication of the source table. In addition, the system includes a replication server. The replication server includes a memory device for storing data and a processor communicatively coupled to the memory device. The processor is programmed to establish a plurality of database connections to the second database. The processor is also programmed to receive one or more replication operations from the first database and to receive one or more replication rules. Each of the replication rules specifies an algorithm for determining a discrete database connection of the plurality of database connections on which to perform each respective replication operation. In addition, the processor is programmed to determine the discrete database connection for each respective replication operation by applying the algorithm specified by the one or more replication rules to each respective replication operation. Moreover, the processor is programmed to perform each respective replication operation at the second database on the respective determined discrete database connection.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
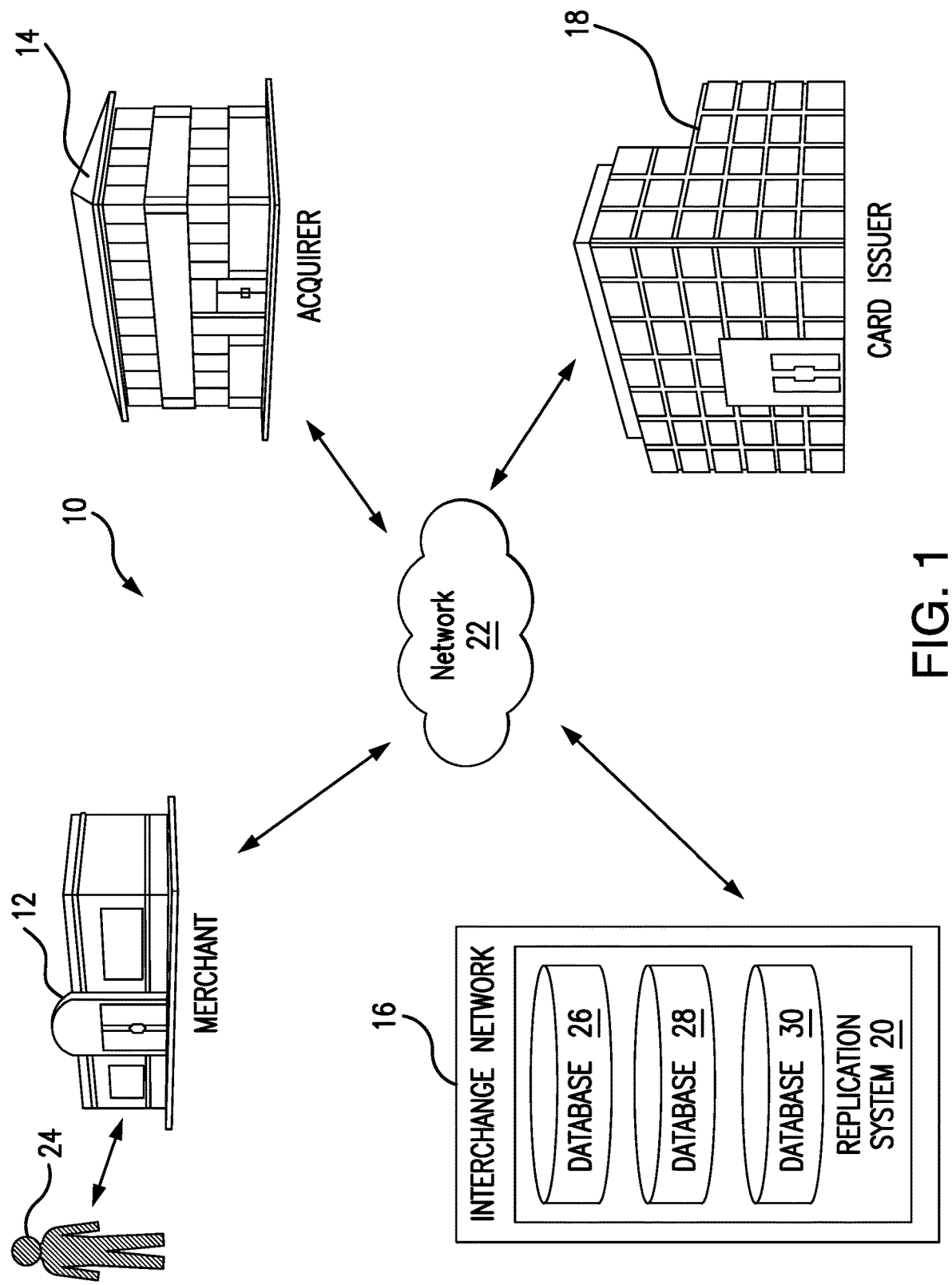
FIG. 1 is a block diagram of an example multi-party payment card network system including a replication system, in accordance with one embodiment of the present disclosure.

The figures depict exemplary embodiments for purposes of illustration only. The figures are not intended to limit the present invention to the specific embodiments they depict. One skilled in the art will readily recognize from the following discussion that alternative embodiments of the systems and methods illustrated herein may be employed without departing from the principles of the invention described herein.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled. It is contemplated that the disclosure has general application to providing database replication using parallel processing in industrial, commercial, and residential applications.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments but is not necessarily included. Thus, particular implementations of the present disclosure can include a variety of combinations and/or integrations of the embodiments described herein.

Embodiments of the present technology relate to systems, computer-readable media, and computer-implemented methods for database replication using a plurality of database connections for processing parallel data streams. Embodiments of the present technology efficiently load balance SQL statements executed across many JDBC database connections, enabling replication software to take full advantage of the multi-processing capabilities of database servers.

According to one embodiment of the disclosure, a database replication software application is configured to accept a rules configuration file that includes one or more algorithms for processing a data replication operation, such as an SQL statement concerning changes to data contained in a database. The database replication software application receives replications operations (e.g., changes made to data) from one database that are to be replicated on a second database. The rules configuration file includes instructions for processing the replication operations to determine a discrete database connection in which to perform the replication operation.

The instructions define one or more algorithms that are to be applied to the replication operations. Each replication operation references a data record that includes a unique identifier. By applying the algorithms defined by the rules to the data record unique identifier, a discrete data connection is determined for each data record. The replication operation is then carried out for that particular record on the determined data connection. As such, a plurality of replication operations may be carried out substantially simultaneously on a plurality of discrete data connections to the database, thereby enabling use of the database servers multi-processing capabilities, while enabling changes to the same or related data records to be carried out sequentially on a single database connection.

The methods and systems described herein may be implemented using computer programming or engineering techniques including computer software, firmware, hardware, or any combination or subset therefor. At least one of the technical problems addressed by this system includes: (i) database replication software unable to write in parallel to a database due to the need to maintain strict sequential order of inserts, updates, and deletes to database records; and (ii) the limited rate at which database replication software can parse and execute larges batches of SQL statements.

A technical effect of the systems and methods described herein is achieved by performing at least one of the following operations: (i) establishing a plurality of database connections to a first database; (ii) receiving one or more replication operations from a second database; (iii) receiving one or more replication rules; (iv) determining the discrete database connection for each respective replication operation based on the replication rules; and (v) performing each respective replication operation at the first database on the respective determined discrete database connection.

The resulting technical effect achieved by the systems and methods described herein is at least one of: (i) maintaining sequential order of data record changes; (ii) writing data record changes in parallel to a replicate database server; and (iii) load balancing data record changes across many simultaneous database connections.

As used herein, the term "database" includes either a body of data, a relational database management system (RDBMS), or both. As used herein, a database includes, for example, and without limitation, a collection of data including hierarchical databases, relational databases, flat file databases, object-relational databases, object oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL. However, any database may be used that enables the systems and methods to operate as described herein.

As will be appreciated, based on the description herein, the technical improvement in parallel processing database replication systems as described is a computer-based solution to a technical deficiency or problem that is itself rooted in computer technology (i.e., the problem itself derives from the use of computer technology). More specifically, the technical problems and inefficiencies created by conventional database replication and related methods (e.g., requirement for strict sequential ordering of replication transactions, transactions per second limitation on single database connection, etc.) are the result of an implementation and use of computers in those database replication systems and methods. The present invention improves upon the conventional methods and systems in the manners described herein. Thus, the inefficiencies or technical problems created by the conventional database replication systems and methods as described herein are solved (i.e., the desired outcome of efficient load balancing of replication transactions across many database connections and increased number of replication transactions per second being written are achieved) by the methods and systems described and particularly claimed herein.

Exemplary System

FIG. 1 is a block diagram of an example multi-party payment card network system 10, including a replication system 20. The payment card network system 10 facilitates providing interchange network services offered by an interchange network 16. In addition, the payment card network system 10 enables payment card transactions in which merchants 12, acquirers 14, and/or card issuers 18 do not need to have a one-to-one relationship. Although parts of the payment card network system 10 are presented in one arrangement, other embodiments may include the same or different parts arranged otherwise, depending, for example, on authorization processes for purchase transactions, communication between computing devices, etc.

In the example embodiment, the payment card network system 10 generally includes the merchants 12, the acquirers 14, the interchange network 16, and the issuers 18 coupled in communication via a network 22. The network 22 includes, for example and without limitation, one or more of a local area network (LAN), a wide area network (WAN) (e.g., the Internet, etc.), a mobile network, a virtual network, and/or any other suitable public and/or private network capable of facilitating communication among the merchants 12, the acquirers 14, the interchange network 16, and/or the issuers 18. In some embodiments, the network 22 may include more than one type of network, such as a private payment transaction network provided by the interchange network 16 to the acquirers 14 and/or the issuers 18, and separately, the public Internet, which may facilitate communication between the merchants 12, the interchange network 16, the acquirers 14, and/or the consumers 24.

Embodiments described herein may relate to a transaction card system, such as a credit card payment system using the Mastercard® interchange network. (Mastercard is a registered trademark of Mastercard International Incorporated). The Mastercard interchange network is a set of proprietary communications standards promulgated by Mastercard International Incorporated for the exchange of financial transaction data and the settlement of funds between financial institutions that are members of Mastercard International Incorporated. As used herein, financial transaction data includes a unique account number associated with an account holder using a payment card issued by an issuer, purchase data representing a purchase made by the cardholder, including a type of merchant, amount of purchase, date of purchase, and other data, which may be transmitted between any parties of multi-party payment card network system 10.

In a typical transaction card system, a financial institution called the "issuer" issues a transaction card, such as a credit card, to a cardholder or consumer 24, who uses the transaction card to tender payment for a purchase from the merchant 12. In the example embodiment, the merchant 12 is typically associated with products, for example, and without limitation, goods and/or services, that are offered for sale and are sold to the consumers 24. The merchant 12 includes, for example, a physical location and/or a virtual location. A physical location includes, for example, a brick-and-mortar store, etc., and a virtual location includes, for example, an Internet-based store-front.

To accept payment with the transaction card, the merchant 12 must normally establish an account with a financial institution that is part of the payment card network system 10. This financial institution is usually called the "merchant bank," the "acquiring bank," or the acquirer 14. When the cardholder 24 provides payment for a purchase with a transaction card, the merchant 12 requests authorization from the acquirer 14 for the purchase amount. The request may be performed over the telephone but is usually performed using a point-of-sale terminal that reads the cardholder's account information from a magnetic stripe, a chip, or embossed characters on the transaction card and communicates electronically with the transaction processing computers of the acquirer 14. Alternatively, the acquirer 14 may authorize a third party to perform transaction processing on its behalf. In this case, the point-of-sale terminal will be configured to communicate with the third party. Such a third party is usually called a "merchant processor," an "acquiring processor," or a "third party processor."

Using the interchange network 16, computers of the acquirer 14 or merchant processor will communicate with computers of the issuer 18 to determine whether the cardholder's account is in good standing and whether the purchase transaction is covered by the cardholder's available credit line. Based on these determinations, the request for authorization will be declined or accepted. If the request is accepted, an authorization code is issued to the merchant 12. Each of these transactions may be stored by the interchange network 16 in one or more tables (not shown in FIG. 1) that make up one or more databases, such as databases 26, 28, and 30. It is noted that the databases 26, 28, and 30, described herein, are database servers and may be discrete servers distributed remotely from one another.

When a request for authorization is accepted, the available credit line of the cardholder's account is decreased. Normally, a charge for a payment card transaction is not posted immediately to the cardholder's account because bankcard associations, such as Mastercard, have promulgated rules that do not allow the merchant 12 to charge, or "capture," a transaction until the purchased goods are shipped or the purchased services are delivered. However, with respect to at least some debit card transactions, a charge may be posted at the time of the transaction. When the merchant 12 ships or delivers the goods or services, the merchant 12 captures the transaction by, for example, appropriate data entry procedures on the point-of-sale terminal. This may include bundling of approved transactions daily for standard retail purchases. If the cardholder 24 cancels a transaction before it is captured, a "void" is generated. If the cardholder 24 returns goods after the transaction has been captured, a "credit" is generated. The interchange network 16 and/or the issuer 18 stores the transaction data, such as, and without limitation, payment account number (PAN), a type of merchant, a merchant identifier, a location where the transaction was completed, an amount of purchase, a merchant category code, a date and time of the transaction, products purchased and related descriptions or identifiers, etc., in a transaction database, such as one of the databases 26, 28, and 30.

After a purchase has been made, a clearing process occurs to transfer additional transaction data related to the purchase among the parties to the transaction, such as the acquirer 14, the interchange network 16, and the issuer 18. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among the merchant 12, the acquirer 14, and the issuer 18. Settlement refers to the transfer of financial data or funds among the merchant 12, the acquirer 14, and the issuer 18 related to the transaction. Usually, transactions are captured and accumulated into a "batch," which is settled as a group. More specifically, a transaction is typically settled between the issuer 18 and the interchange network 16, and then between the interchange network 16 and the acquirer 14, and then between the acquirer 14 and the merchant 12. It should be appreciated that more or less information related to transactions, as part of either authorization, clearing, and/or settling, may be included in the transaction data, and stored within the databases 26, 28, and 30, at the merchant 12, the acquirer 14, the payment network 16, and/or the issuer 18. Further, transaction data, unrelated to a particular payment account, may be collected by a variety of techniques, and similarly stored within the databases 26, 28, and 30.

In some embodiments, cardholders 24 involved in the transactions described herein are prompted to agree to legal terms associated with their payment accounts, for example, during enrollment in such payment accounts, etc. As such, the cardholder 24 may voluntarily agree to allow the merchants 12, the issuers 18, the interchange network 16, etc., to utilize data collected during enrollment and/or collected relating to processing the transactions, subsequently for one or more of the purposes described herein.

In the exemplary embodiment, the interchange network 16 includes a data replication system 20 that is configured to allow data, such as the transaction data, to be stored by a group of computers, and updated by one or more members of the group. While the interchange network 16 is illustrated as a single component in FIG. 1, it should be appreciated that the interchange network 16 may be a network of distributed computers or data centers, each coupled to the payment card network system 10, for example, via the network 22. For example, and without limitation, each of databases 26, 28, and 30 may be geographically remote from each other database 26, 28. and 30, or they may be housed in a single data center but be physically separate databases.

The replication system 20 is a specially programmed computer system that generally logs changes to the transaction data, such as one or more tables (not shown in FIG. 1), and propagates such changes to other connected databases to facilitate maintaining consistent copies of the transaction data or tables across all connected databases, such as the databases 26, 28, and 30. For example, one or more inserts, updates, or deletes of transaction data to a table are replicated in sequential order in the replicated table on each other database. The sequential ordering of the replication operations facilitates maintaining a transaction commit order at the source database. For example, if a row is added to one table of a database and subsequently updated on the database, you could not successfully replicate the row without first adding the row to the other databases and subsequently modifying the row. The update replication procedure must occur in sequence with the add replication procedure.

While only one merchant 12, acquirer 14, interchange network 16, and issuer 18 are shown in FIG. 1 (for ease of reference), it should be appreciated that a variety of other embodiments may include multiple ones of these parts in various combinations.

Figure 2:
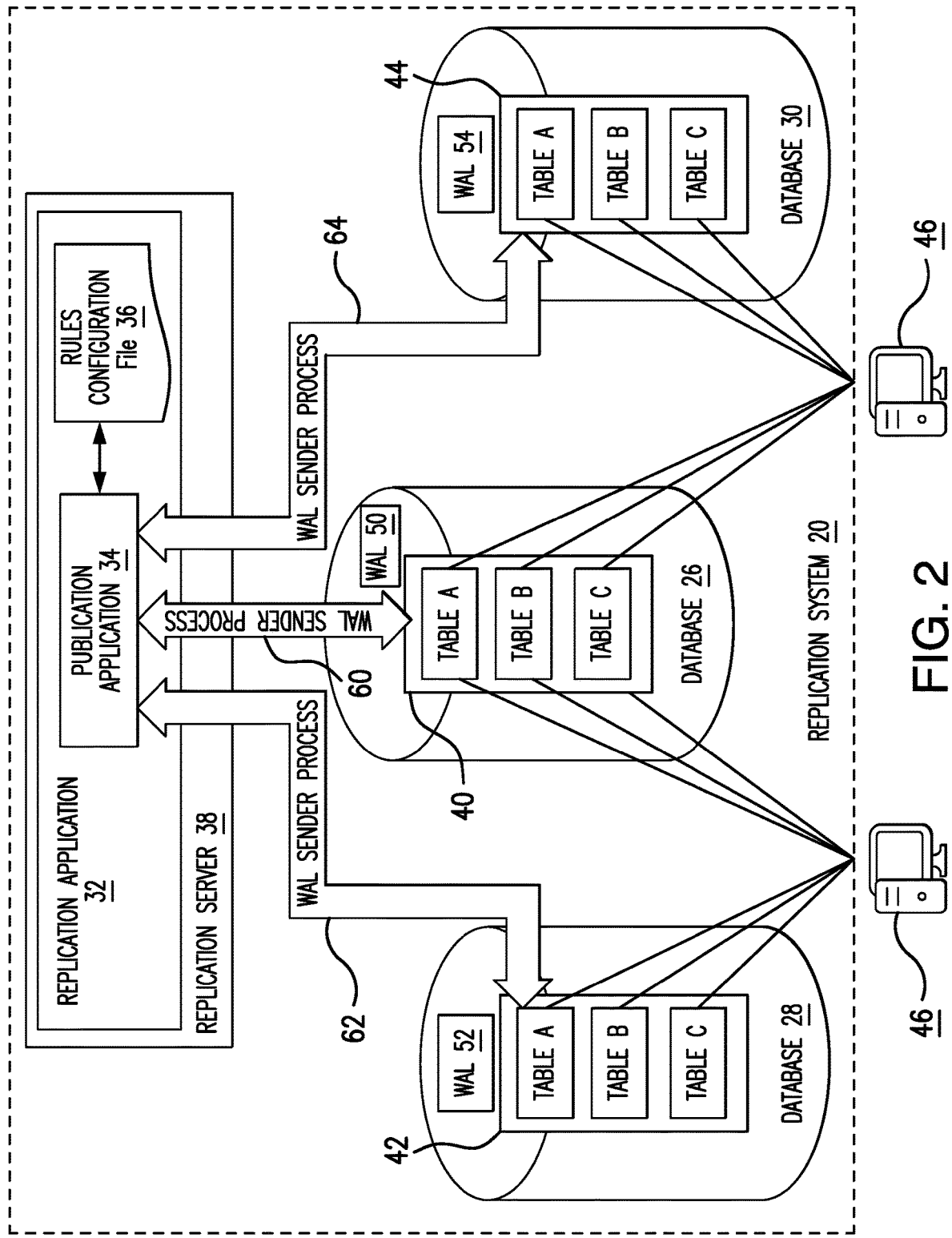
FIG. 2 is a block diagram of the replication system shown in FIG. 1.

FIG. 2 is a block diagram of the replication system 20 for use with the interchange network 16 (shown in FIG. 1). In the exemplary embodiment, the replication system 20 is a multi-master replication (MMR) system. However, it is contemplated that the replication system may be a single master replication (SMR) system or any number of hybrid replication systems. A MMR system, such as the illustrated replication system 20, allows for geographically distributed database masters (broadly nodes) with read/write access, described herein as databases 26, 28, and 30. Two or more databases are designated in which tables, such as tables A, B, and C, with the same table definitions and initial row sets are created. Changes (inserts, updates, and deletions) to table rows (broadly, table records) are allowed to occur in any database (e.g., any of databases 26, 28, 30). The changes may be written to any of the tables, for example, and without limitation, by one or more computing devices 46 (e.g., a cardholder computing device, a merchant point-of-sale device, and the like). Changes to the table rows in any given database are replicated to their counterpart tables in every other database. In a SMR system, however, changes (inserts, updates, and deletions) to the table rows are allowed to occur in a single designated master database. The table row changes are replicated to tables in one or more slave databases. The replicated tables in the slave databases are not permitted to accept any changes except from its designated master database.

In the exemplary embodiment, the database 26 is shown as a master definition node (MDN) and includes a publication 40 defined therein. The publication 40 identifies the transaction data that is available for copying by the replication system 20 between the databases 26, 28, and 30. In the exemplary embodiment, the publication 40 includes tables A, B, and C (also referred to as source tables A, B, and C), although the publication can be defined to include any combination of data desired. After the publication 40 is defined, the replication system synchronizes the tables or data defined by the publication to each master node, such as the databases 28 and 30, as replication publications 42 and 44, respectively. Changes (inserts, updates, and deletions) to rows of the publication tables (e.g., tables A, B, and C) on any master node, including the MDN, are synchronized to all other nodes on an on-demand and/or scheduled basis. The replication system 20 performs replications asynchronously. That is, the systems hosting the databases, such as databases 28 and 30, do not always have to be running continuously in order for successful replication to occur. If one system goes offline, replication resumes when it comes back online if there is still pending data to replicate. In addition, the replication system 20 may initiate and perform replications regularly according to a user-defined schedule. This allows the replication system 20 to run in an unattended mode of operation.

In the exemplary embodiment, the databases 26, 28, and 30 (or nodes) use a log-based replication method for replicating the transaction data and changes made thereto. The log-based method ensures that a master node with changes (inserts, updates, and deletions) to rows of the publication tables (e.g., tables A, B, and C) will not commit those changes (i.e., replication operations) until the target master node acknowledges that the commit has been written to its transaction log. For example, and without limitation, each master node generally operates in a continuous archiving mode and a continuous recovery mode. The nodes (e.g., the databases 26, 28, and 30) maintain write-ahead log files (WAL files) 50, 52, and 54 respectively, of table changes. The changes are subsequently streamed to the other nodes. In addition, each master node runs a dedicated WAL sender process, reference numerals 60, 62, and 64, respectively, to send the WAL files 50, 52, and 54 to the other nodes via a publication application 34. The publication application 34 is a component of a replication application 32 running on a replication server 38. The replication server may be a discrete server, separate from the databases 26, 28, and 30, or may be a server software application running on at least one of the databases 26, 28, or 30.

Each node receives the WAL files 50, 52, and/or 54 and writes the entries to a transaction log on a local disk (not shown). In particular, the extracted changes (i.e., replication operations) are converted to an in-memory data structure and applied to the target tables by means of structure query language (SQL) statements executed using Java database connectivity (JDBC) batches. In this manner, each master node can maintain an accurate copy of the tables A, B, and C, even as they are changed on each master node.

Figure 3:
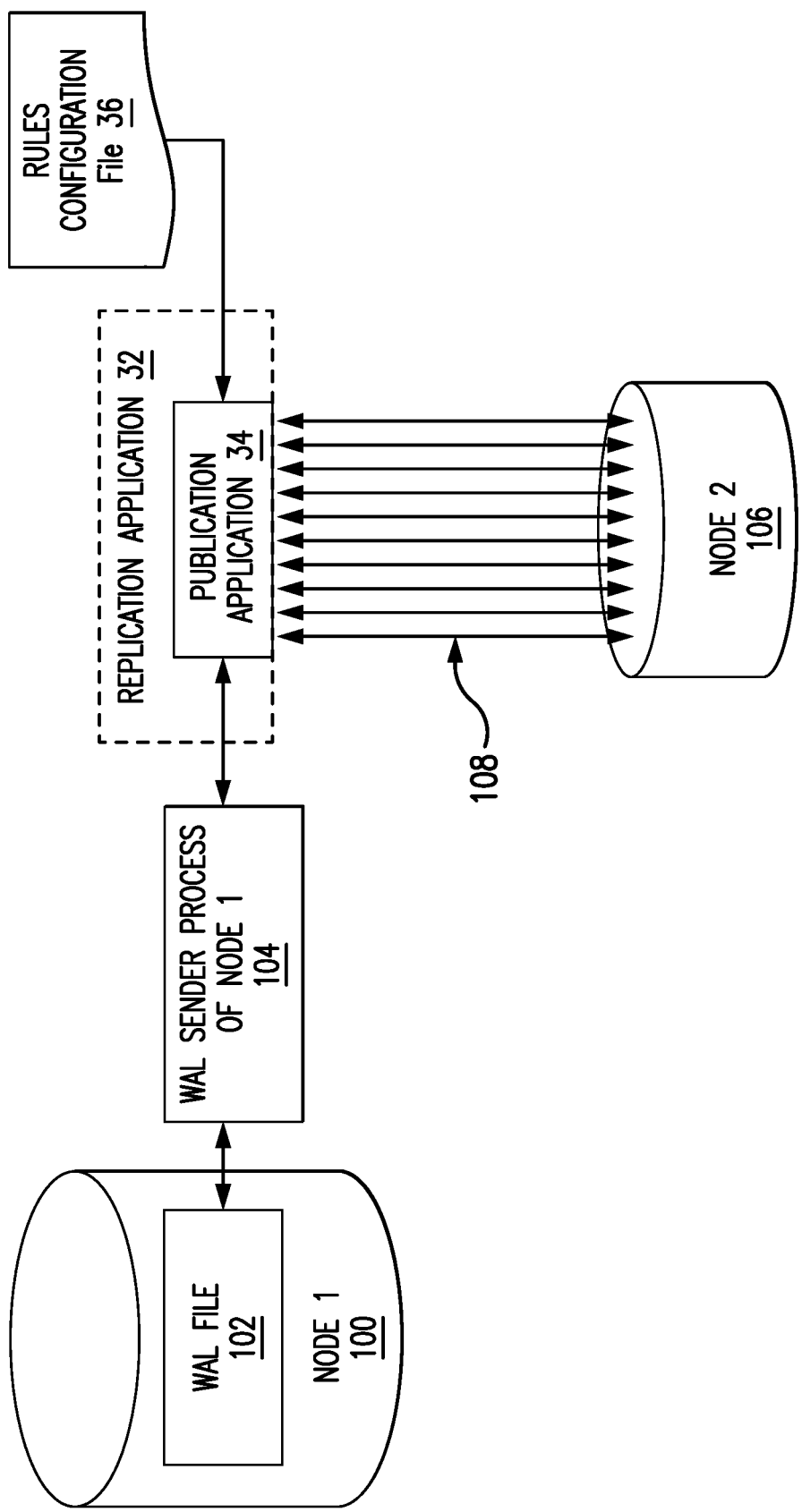
FIG. 3 is a schematic of a replication data flow from a first node to a second node for use with the replication system of FIG. 2.

FIG. 3 is a schematic of a replication data flow from a first node to a second node as described herein. In the exemplary embodiment, a WAL file 102 on a first node, such as a node 1 represented by reference numeral 100, is transmitted to a second node, such as a node 2 represented by reference numeral 106, via the publication application 34 as described above. In particular, a WAL sender process 104 of the node 1 transmits the WAL file 102 to the publication application 34. The publication application 34 then parses the WAL file 102 and performs replication operations defined therein on the second node 106. Specifically, the publication application 34 performs certain ones the replication operations on a predefined connection of a plurality of connections 108 (e.g., JDBC connections) established between the publication application 34 and the second node 106, for example, via the replication application 32 and/or the publication application 34. In the exemplary embodiment, the total number of the plurality of connections 108 are defined by a user of the replication system 20 (shown in FIG. 2) and enable the publication application 34 to transmit a plurality of replication operations to the second node 106 simultaneously for parallel processing of the changes, thereby enabling the replication application 32 to properly exploit the multi-processing capability of the database server, such as the second node 106.

Referring to FIGS. 2 and 3, it is noted that the replication application 32 is not a single, executable program, but rather a set of programs or applications along with data stores (not shown) containing configuration information and metadata that operate together to form the replication system 20. In the exemplary embodiment, the replication application 32 includes, at least in part, the publication application 34 and a rules configuration file 36. The publication application 34 is used to configure the nodes (e.g., the databases 26, 28, and 30) for replication and performs the replication process. The rules configuration file 36 includes, by way of example only, replication configuration rules, connection information, connection determination algorithms, etc. used by the publication application 34 to establish the connections 108 between the publication application 34 and the nodes. The rules configuration file 36 may be, for example, and without limitation, a text file, a JavaScript object notation (JSON) file, an extensible markup language (XML) file, or the like. Typically, the rules configuration file 36 stores information in an organized, easy-to-access manner in a human-readable collection of data that a user can access and edit in an easy, logical manner. The use of such a rules configuration file enables the update or modification of the rules in real-time. For example, and without limitation, the configuration file may be updated and reloaded or re-imported by the publication application 34 before a subsequent replication process is started. In addition, with the use of the WAL files, as described herein, updated rules may be processed in a simulation mode, where the changes may be reviewed prior to committing to the replicate databases.

An exemplary rules configuration file 36 is presented below as Table 1. While the example rules configuration file 36 only contains entries relating to tables A and B and a default rule, in other embodiments multiple entries may be included in the rules configuration file 36 detailing the connection rules for multiple tables or data that are to be replicated. The example entries associated with tables A and B and the default rule are provided herein for the sake of brevity and clarity.

TABLE 1

| Table Name | Replication Operation | no_of_db_connections | Formula |
|---|---|---|---|
| Table A | INSERT UPDATE DELETE | 200 | (pk_numeric MOD no_of_db_connections) + 1 |
| Table B | INSERT UPDATE DELETE | 200 | (fk_numeric MOD no_of_db_connections) + 1 |
| Default | INSERT UPDATE DELETE | 1 | 201 |

Typically, the rows of transaction data stored in, for example, Table A (e.g., a referenced table), are associated with an identifier for easier access and identification. The identifier assigned to a transaction data value or set of transaction data values may be unique to the associated transaction data with respect to other identifiers used for all of the transaction data stored in the table. As used herein, such an identifier is referred to as a "primary key." The rows of transaction data stored in, for example, Table B (e.g., a referencing table), are also associated with an identifier that may reference the associated data in Table A. Such an identifier is referred to as a "foreign key" in Table B. The foreign key is a field in Table B that is the same as the primary key in Table A. As such, the transaction data in Table B references specific transaction data in Table A. For example, and without limitation, Table A may contain transaction data about specific transactions against a plurality of primary account numbers (PANs). Table B may contain personal information corresponding to cardholders associated with specific ones of the PANs. In such an example, the PAN may be used as a primary key in Table A (identifying specific transactions) and a foreign key in Table B (linking cardholder personal information to the identifying specific transactions).

In an example based on the rules configuration file 36 of Table 1, when the publication application 34 extracts a row operation for Table A from a WAL file, such as from the WAL file 50 associated with the database 26, the publication application 34 parses the rules configuration file 36 to extract the formulas and performs the specified formula associated with Table A. For example, as shown in Table 1, the following equation may be used to determine a discrete database connection 108 for transmitting changes (operations) made to specific rows.

$$(A \bmod B)+1=db \text{ connection}$$

Where A equals the primary key of the respective row changes (inserts, updates, and deletions) to be replicated and B equals the number of database connections 108 (or the modulus of the function) between the publication application 34 and respective databases, such as databases 26, 28, and 30. The mod operator, or modulo operation, finds the remainder value after Euclidean division of A by B. The equation includes the addition of 1 to the modulo operation to ensure that the result is always in the range between or equal to 1 and B.

In an example using the Table 1 factors, the publication application 34 takes the primary key (pk_numeric) of the transaction data of the corresponding row and performs the modulo (MOD) operation on it using the number of database connections (no_of_db_connections), or modulus, specified in the rules configuration file 36. The modulo operation finds the remainder after Euclidean division of the primary key divided by the number of database connections (or modulus) and adds 1. The result is the database connection for transmission of the replication operation for that particular table row. For example, if the primary key of the transaction data row is two-hundred (200) and there are two-hundred (200) database connections available ((200 mod 200)+1=1), then the replication operation associated with that transaction data row gets written to database connection 1. Similarly, when the publication application 34 extracts a row operation for Table B, it performs a similar modulo operation except using the foreign key of the Table B row. Thus, operations on associated data in Tables A and B will be written to the same database connection because the primary and foreign keys will match. If there are no rules for a table defined in the rules configuration file 36, the above example rules configuration file indicates that the replication operations are to be written to database connection 201, which is a discrete connection from any result of the defined functions. As such, inserts, updates, and deletes of a particular table row are written to and executed on the same database connection and are therefore executed sequentially. However, inserts, updates, and deletes of particular table rows that are unrelated are written to and executed on discrete database connections and are executed simultaneously or in parallel, thus decreasing the time for performing the replication operations and making use of the multi-processing capabilities of the database server.

Figure 4:
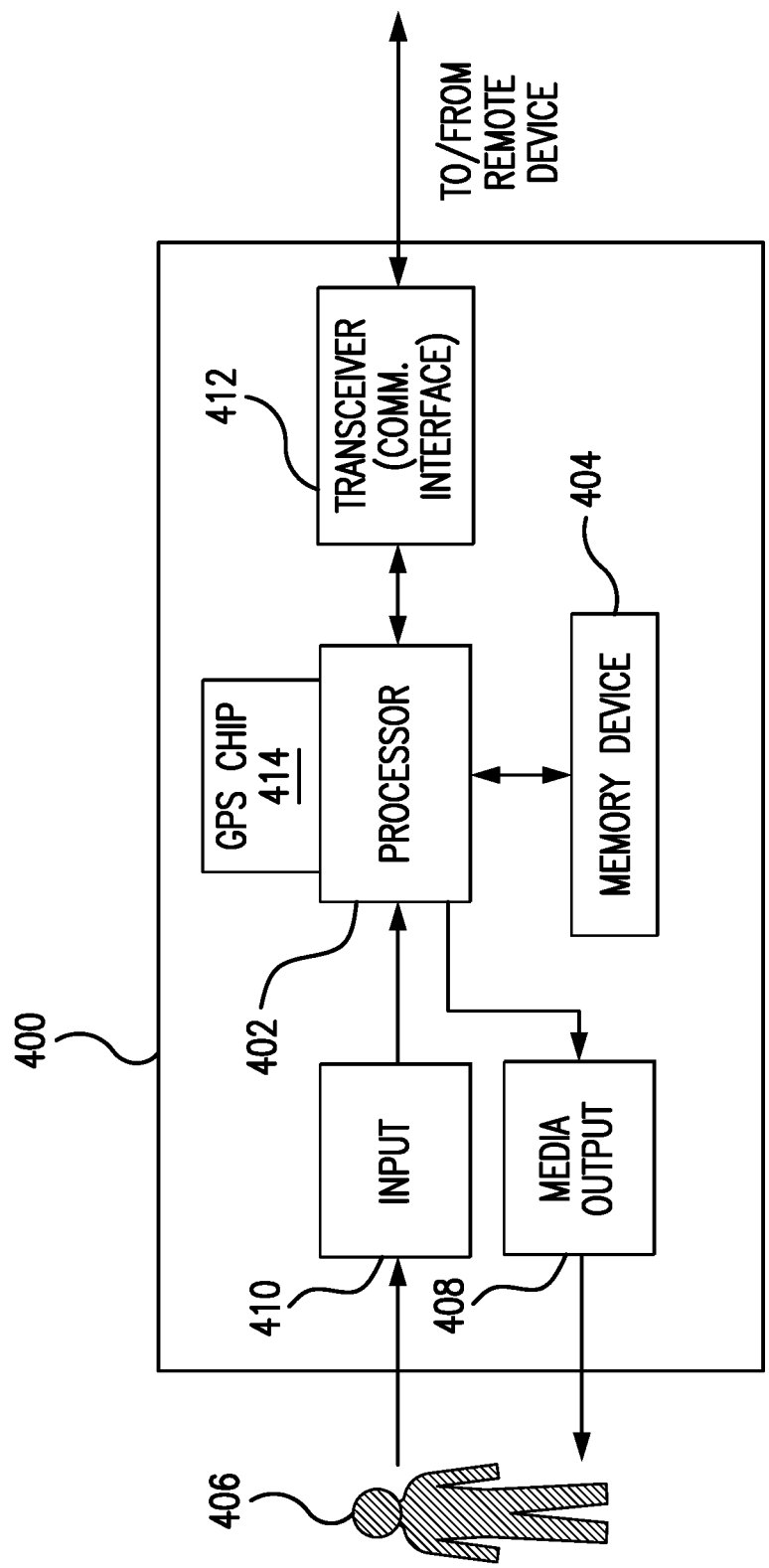
FIG. 4 is an example configuration of a computer system used to perform one or more inserts, updates, or deletes of data contained in tables of one of databases shown in FIG. 2.

FIG. 4 is an example configuration of a computer system 400 used to perform one or more inserts, updates, or deletes of data contained, for example, in tables A, B, and/or C of one of databases 26, 28, and/or 30. The computer system 400 may include, for example, the computing devices 46 shown in FIG. 2.

In the example embodiment, the computer system 400 includes one or more processors 402 for executing instructions. In some embodiments, executable instructions are stored in a memory device 404. The processor 402 may include one or more processing units arranged, for example, in a multi-core configuration. The memory device 404 is any device allowing information, data, executable instructions, and/or written works to be stored and retrieved. The memory device 404 includes one or more computer readable media.

In one example embodiment, the processor 402 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

A location of the computer system 400 can be obtained through conventional methods, such as a location service (e.g., global positioning system (GPS) service) in the computer system 400, "ping" data that includes geotemporal data, from cell location register information held by a telecommunications provider to which the computer system 400 is connected, and the like. For example, in one suitable embodiment, a GPS chip 414 can be part of or separate from the processor 402 to enable the location of the computer system 400 to be determined.

The computer system 400 also includes at least one media output component 408 for presenting information to a user 406. The media output component 408 is any component capable of conveying information to the user 406. In some embodiments, the media output component 408 includes an output adapter such as a video adapter and/or an audio adapter. The output adapter is operatively coupled to the processor 402 and operatively connectable to an output device such as a display device, a liquid crystal display (LCD), organic light emitting diode (OLED) display, or "electronic ink" display, or an audio output device, such as an integrated speaker and the like.

In one example embodiment, the media output component 408 includes an integrated display, which can include, for example, and without limitation, a liquid crystal display (LCD), an organic light emitting diode (OLED) display, or an "electronic ink" display. In some embodiments, the integrated display may optionally include a touch controller for support of touch capability. In such embodiments, the computer system 400 may detect the user's presence by detecting that the user 406 has touched the integrated display on the computer system 400.

In some embodiments, the computer system 400 includes an input device 410 for receiving input from the user 406. The input device 410 may include, for example, a touch sensitive panel, a touch pad, a touch screen, a stylus, a gyroscope, an accelerometer, a position detector, a keyboard, a pointing device, a mouse, or an audio input device. A single component such as a touch screen may function as both an output device of the media output component 408 and the input device 410, as described above. The computer system 400 may also include a transceiver 412 (broadly, a communication interface), which is communicatively connectable to the network 22 (shown in FIG. 1) and/or a remote device such as a merchant point-of-sale device (not shown). The transceiver 412 may include, for example, a wired or wireless network adapter or a wireless data transceiver for use with radio frequency communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 404 are, for example, computer readable instructions for providing a user interface to the user 406 via the media output component 408 and, optionally, receiving and processing input from the input device 410. A user interface may include, among other possibilities, a web browser and/or a payment application (e.g., a digital wallet). Web browsers enable users, such as the user 406, to display and interact with media and other information typically embedded on a web page or a website from a merchant. A payment application allows the user 406 to interact with a merchant to perform electronic transactions.

Figure 5:
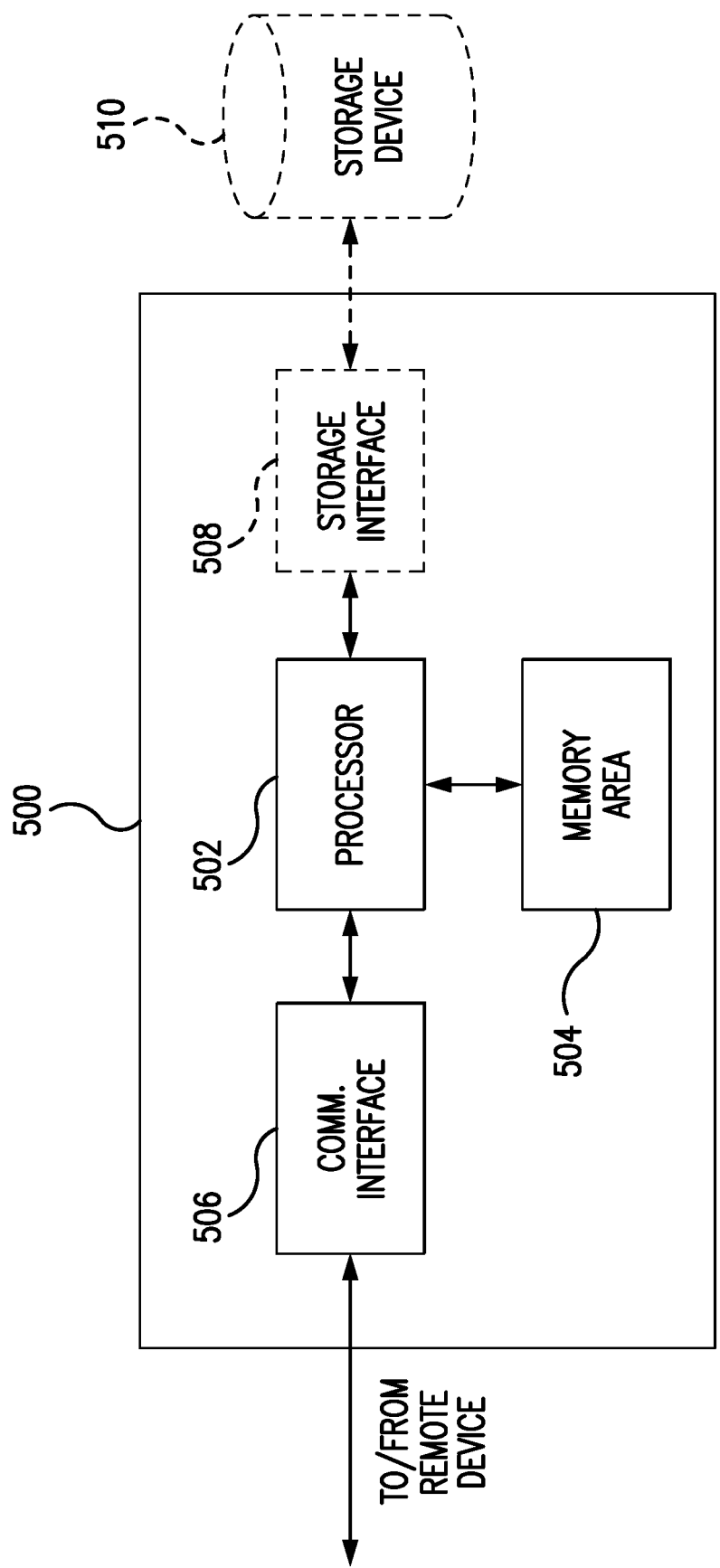
FIG. 5 is an example configuration of a server system, such as the databases and/or the replication server shown in FIG. 2.

FIG. 5 is an example configuration of a server system 500, such as the databases 26, 28, and 30, and/or the replication server 38 (each shown in FIG. 2). In the example embodiment, the server system 500 includes a processor 502 for executing instructions. The instructions may be stored in a memory area 504, for example. The processor 502 includes one or more processing units (e.g., in a multi-core configuration) for executing the instructions, for example, in parallel operations. The instructions may be executed within a variety of different operating systems on the server system 500, such as UNIX, LINUX, Microsoft Windows®, etc. More specifically, the instructions may cause various data manipulations on data stored in a storage device 510 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.).

In one example embodiment, the processor 502 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

The processor 502 is operatively coupled to a communication interface 506 such that the server system 500 can communicate with a remote device such as a computer system 400 or another server system 500. For example, the communication interface 506 may receive communications from the computer system 400 via the Internet, as illustrated in FIGS. 1 and 2.

The processor 502 is operatively coupled to the storage device 510. The storage device 510 is any computer-operated hardware suitable for storing and/or retrieving data. In some embodiments, the storage device 510 is integrated in the server system 500 and is like the databases 26, 28, and 30 (shown in FIG. 1). In other embodiments, the storage device 510 is external to the server system 500. For example, the server system 500 may include one or more hard disk drives as the storage device 510. In other embodiments, the storage device 510 is external to the server system 500 and may be accessed by a plurality of server systems 500. For example, the storage device 510 may include multiple storage units such as hard disks or solid-state disks in a redundant array of inexpensive disks (RAID) configuration. The storage device 510 may include a storage area network (SAN) and/or a network attached storage (NAS) system.

In some embodiments, the processor 502 is operatively coupled to the storage device 510 via a storage interface 508. The storage interface 508 is any component capable of providing the processor 502 with access to the storage device 510. The storage interface 508 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 502 with access to the storage device 510.

The memory area 504 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

Exemplary Computer-Implemented Method

Figure 6:
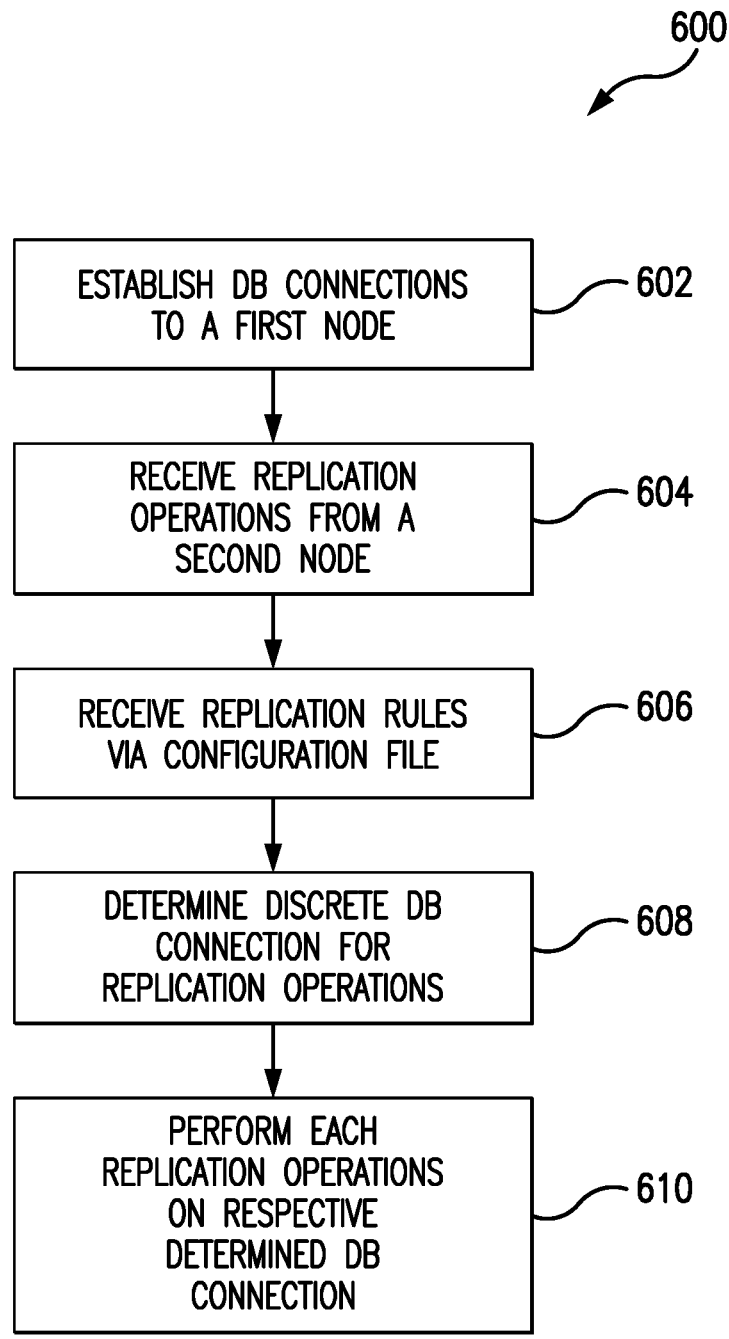
FIG. 6 is a flowchart illustrating an exemplary computer-implemented method for database replication using a plurality of database connections shown in FIG. 3 in parallel, in accordance with one embodiment of the present disclosure.

FIG. 6 is a flowchart illustrating an exemplary computer-implemented method 600 for database replication using a plurality of database connections 108 (shown in FIG. 3) in parallel, in accordance with one embodiment of the present disclosure. The operations described herein may be performed in the order shown in FIG. 6 or may be performed in a different order. Furthermore, some operations may be performed concurrently as opposed to sequentially. In addition, some operations may be optional.

The computer-implemented method 600 is described below, for ease of reference, as being executed by exemplary devices and components introduced with the embodiments illustrated in FIGS. 1-5. In one embodiment, the computer-implemented method 600 may be implemented by the replication system 20 (shown in FIG. 1). In the exemplary embodiment, the computer-implemented method 600 relates to data replication among a plurality of databases, such as databases 26, 28, and 30 (each shown in FIG. 1), using a plurality of Java database connectivity (JDBC) connections 108. While operations within the computer-implemented method 600 are described below regarding the replication server 38 (shown in FIG. 2), the computer-implemented method 600 may be implemented using any of the databases servers, such as nodes 1 or 2 (shown in FIG. 3), as well as other such computing devices and/or systems through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

Referring to operation 602, a plurality of database connections 108 are established with a first node, such as node 1 shown in FIG. 3. In particular, a user of the replication system 32 may specify a total number of database connections 108 to establish between the replication server 38 (shown in FIG. 2) and each of the connected databases or nodes, such as databases 26, 28, and 30. In the exemplary embodiment, the plurality of connections 108 are JDBC connections. JDBC is an application programming interface (API) for Java that is used to define how a client may access a database. The connections are established by loading a JDBC driver and using a JDBC driver manager to create one or more JDBC connections, as is understood by one skilled in the art.

At operation 604, one or more replication operations are received from a second node, such as node 2 shown in FIG. 3. More specifically, a WAL file, such as WAL file 102 (shown in FIG. 3), is received from the first node, for example via a WAL sender process described herein. The WAL file is a log of changes to the data files (such as tables A, B, and C). In particular, the WAL file logs changes to be applied to the publication tables, which are defined by the publication 40 described herein. After the changes are retrieved via the WAL sender process, the replication server 38 parses the WAL file to determine the one or more replication operations contained therein and applies the set of changes to the other databases (or nodes) using transaction sets consisting of JDBC batches of SQL statements, as described herein.

At operation 606, one or more replication rules are received. Specifically, the publication application 34 receives and/or reads the rules configuration file 36 (shown in FIG. 2). The publication application 34 parses the configuration file to extract the one or more replication rules for application to the received replication operations. Each replication rule specifies an algorithm for determining a discrete database connection of the plurality of database connections 108 for each respective replication operation.

At operation 608, a discrete database connection for each respective replication operation is determined by applying an algorithm specified by the one or more replication rules to the one or more replication rules. In particular, one of the publication application 34 or the replication application 32 determines a respective database connection for each table record identified as being changed by a respective replication operation extracted from the WAL file. In the exemplary embodiment, the publication application 34 or the replication application 32 performs a modulo operation on a table record identifier, such as a primary key or a foreign key, to generate a modulo result. The modulo result is then used in a subsequent computation to determine the discrete database connection number for performing the replication operation for that respective table record. The replication operation may include, for example, and without limitation, an SQL statement that represents one of an INSERT, an UPDATE, or a DELETE statement.

In one example, the first node described above may include a first table (e.g., a referenced table) and a second table (e.g., a referencing table) defined therein, which are listed in a publication for replication to the second node. The referenced table may include, for example, one or more referenced table records, each having a primary key associated therewith. The referencing table may include, for example, one or more referencing table records, each having a foreign key associated therewith. Each foreign key references a respective primary key of the one or more referenced table records. Each of the respective replication operations corresponds to one of a referenced table record or referencing table record. For a replication operation corresponding to a referenced table record, the publication application 34 or the replication application 32 performs a modulo operation on the primary key of the corresponding referenced table record to generate a first modulo result. In addition, for a replication operation corresponding to a referencing table record, the publication application 34 or the replication application 32 performs a modulo operation on the foreign key of the corresponding table record to generate a second modulo result. The first and second modulo result are then used in a subsequent computation to determine the discrete database connection number for performing the replication operations for the respective table records, where the discrete database connection is the same connection for a primary key and a referencing foreign key record.

At operation 610, the replication operations are performed at the second node using the determined database connections as described above. In an example embodiment, the changes for table records having, for example, sequential primary keys and/or foreign keys, are performed on different database connections substantially simultaneously. As such, the replication server 38 may properly exploit the multi-processing capabilities of the database servers (e.g., nodes 1 and 2) to substantially increase the speed of data replication among the databases.

Additional Considerations

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as transceiver elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

What is claimed is:

1. A method of database replication, the method comprising:
   establishing a plurality of database connections to a first database;
   receiving one or more replication operations from a second database;
   receiving one or more replication rules, wherein each replication rule specifies an algorithm for determining a discrete database connection of the plurality of database connections for each respective replication operation;
   determining the discrete database connection for each respective replication operation by applying the algorithm specified by the respective one or more replication rules to each respective replication operation; and
   performing each respective replication operation at the first database on the respective determined discrete database connection.

2. The method in accordance with claim 1,
   said receiving one or more replication operations is accomplished in accordance with a publication defined on the second database.

3. The method in accordance with claim 1,
   said receiving one or more replication operations comprises receiving a write-ahead log (WAL) file from the second database and parsing the WAL file to determine the one or more replication operations contained therein.

4. The method in accordance with claim 1,
   said receiving one or more replication rules comprises parsing a rules configuration file to extract the one or more rules.

5. The method in accordance with claim 1,
   said second database having a source table defined therein, the source table comprising one or more table records, each table record having an identifier associated therewith,
   wherein each respective replication operation corresponds to a respective table record.

6. The method in accordance with claim 5,
said determining the discrete database connection for each respective replication operation by applying the algorithm comprises:
performing a modulo operation on the identifier of the corresponding table record to generate a modulo result; and
performing a computation on the modulo result to determine the discrete database connection number.

7. The method in accordance with claim 6,
said discrete database connection number is (A mod B)+1, where A is the identifier of the corresponding table record and B is a total number of the plurality of database connections.

8. The method in accordance with claim 5,
wherein the one or more replication operations comprises structure query language (SQL) statements, and
wherein performing each respective replication operation at the first database comprises transmitting the SQL statements to the first database using one or more java database connectivity (JDBC) batches.

9. The method in accordance with claim 8, wherein each respective SQL statement represents one of an INSERT, an UPDATE, or a DELETE statement corresponding to a respective table record of the source table.

10. The method in accordance with claim 5,
wherein the first and second databases are relational databases, and
wherein the identifier of each table record comprises one of a primary key or a foreign key.

11. The method in accordance with claim 1,
said second database having a referenced table and a referencing table defined therein,
the referenced table comprising one or more referenced table records, each having a primary key associated therewith,
the referencing table comprising one or more referencing table records, each having a foreign key associated therewith, each foreign key referencing a respective primary key,
wherein each respective replication operation corresponds to one of a referenced table record or referencing table record.

12. The method in accordance with claim 11,
said determining the discrete database connection for each respective replication operation by applying the algorithm comprising:
for a replication operation corresponding to a referenced table record, performing a modulo operation on the primary key of the corresponding referenced table record to generate a first modulo result;
for a replication operation corresponding to a referencing table record, performing a modulo operation on the foreign key of the corresponding table record to generate a second modulo result; and
performing a computation on the first and second modulo results to determine the discrete database connection number for the respective replication operation.

13. The method in accordance with claim 12,
said discrete database connection number is (A mod B)+1, where A is one of the primary key or the foreign key and B is a total number of the plurality of database connections.

14. A system for performing database replication operations in parallel, the system comprising:
a first database having a source table defined therein, the source table including one or more table records, each table record having an identifier associated therewith;
a second database for receiving a replication of the source table; and
a replication server comprising a memory device for storing data and a processor communicatively coupled to the memory device, the processor programmed to:
establish a plurality of database connections to the second database;
receive one or more replication operations from the first database;
receive one or more replication rules, wherein each replication rule specifies an algorithm for determining a discrete database connection of the plurality of database connections on which to perform each respective replication operation;
determine the discrete database connection for each respective replication operation by applying the algorithm specified by the one or more replication rules to each respective replication operation; and
perform each respective replication operation at the second database on the respective determined discrete database connection.

15. The system in accordance with claim 14,
the receiving one or more replication operations comprises receiving a write-ahead log (WAL) file from the first database and parsing the WAL file to determine the one or more replication operations contained therein.

16. The system in accordance with claim 14,
the receiving one or more replication rules comprises parsing a rules configuration file to extract the one or more rules.

17. The system in accordance with claim 14, wherein each respective replication operation corresponds to a respective table record,
the determining the discrete database connection for each respective replication operation by applying the algorithm comprises:
performing a modulo operation on the identifier of the corresponding table record to generate a modulo result; and
performing a computation on the modulo result to determine the discrete database connection number.

18. The system in accordance with claim 17,
the discrete database connection number is (A mod B)+1, where A is the identifier of the corresponding table record and B is a total number of the plurality of database connections.

19. The system in accordance with claim 18,
wherein the one or more replication operations comprises structure query language (SQL) statements, and
wherein performing each respective replication operation at the second database comprises transmitting the SQL statements to the second database using one or more java database connectivity (JDBC) batches.

20. The system in accordance with claim 14,
wherein the first and second databases are relational databases, and
wherein the identifier of each table record comprises one of a primary key or a foreign key.

* * * * *